United States Patent [19]

Yoshizawa et al.

[11] Patent Number: 6,045,447
[45] Date of Patent: Apr. 4, 2000

[54] IMAGE SYNTHESIS METHOD, GAMES MACHINE, AND INFORMATION STORAGE MEDIUM

[75] Inventors: Hideo Yoshizawa; Motomi Katayama, both of Yokohama, Japan

[73] Assignee: Namco Ltd., Tokyo, Japan

[21] Appl. No.: 08/952,023

[22] PCT Filed: Mar. 18, 1997

[86] PCT No.: PCT/JP97/00868

§ 371 Date: Nov. 6, 1997

§ 102(e) Date: Nov. 6, 1997

[30] Foreign Application Priority Data

Mar. 19, 1996 [JP] Japan .................................... 8-090638

[51] Int. Cl.[7] ........................................................ A63F 9/22
[52] U.S. Cl. .............................................. 463/31; 463/43
[58] Field of Search ................................. 463/1–6, 8, 29, 463/4, 30, 31, 33, 34, 43–47, 16–25; 434/308, 314, 72, 307 R, 76, 80, 309

[56] References Cited

U.S. PATENT DOCUMENTS

| 5,146,557 | 9/1992 | Yamrom et al. | 395/161 |
|---|---|---|---|
| 5,553,864 | 9/1996 | Sitrick | 463/31 |
| 5,575,717 | 11/1996 | Houreit, Jr. et al. | 463/1 |
| 5,586,937 | 12/1996 | Menashe | 463/41 |
| 5,601,487 | 2/1997 | Oshima et al. | 463/4 |
| 5,630,757 | 5/1997 | Gagin et al. | 463/43 |
| 5,634,848 | 6/1997 | Tsuda et al. | 463/25 |
| 5,805,784 | 9/1998 | Crawford | 395/173 |
| 5,807,173 | 9/1998 | Aoyama | 463/23 |

FOREIGN PATENT DOCUMENTS

| 61-58681 | 3/1986 | Japan . |
|---|---|---|
| 8-332282 | 12/1996 | Japan . |
| 2-163-929 | 3/1996 | United Kingdom . |

OTHER PUBLICATIONS

Robert E. Warring, DOOM Totally Unauthorized Tips and Secrets, All Pages, Copyright 1994, Feb. 17, 1994.

*Primary Examiner*—Valencia Martin-Wallace
*Assistant Examiner*—John M Hotaling, II
*Attorney, Agent, or Firm*—Oliff & Berridge, PLC

[57] ABSTRACT

An objective of this invention is to increase the variety of game stages and thus provide a player with a personally-designed game stage. This invention relates to a competitive game in which the player can select one of a plurality of game stages, such as a tennis court. Thus an image is created for enabling selection of a game stage on which the player is to play, from a plurality of game stages, and an image is created for enabling the player to compete against another player on the thus selected game stage. An image is also created for placing an item acquired during competition on the game stage. This enables the player to place items within a game stage and thus create a personally-designed game stage, and also makes play on that game stage more enjoyable. Note that it is preferable that an item possessed by another player can be acquired by transferring it by means of an IC card or communication line.

15 Claims, 10 Drawing Sheets

FIRST PLAYER

SECOND PLAYER

FIG. 8B

INFORMATION STORAGE MEDIUM (FIRST PLAYER)

INFORMATION STORAGE MEDIUM (SECOND PLAYER)

FIG. 8C

FIRST PLAYER

ENTER YOUR DATA OF BIRTH aa / bb / cc

SECOND PLAYER

ENTER YOUR DATA OF BIRTH ee / ff / gg

IMAGE SYNTHESIS METHOD, GAMES MACHINE, AND INFORMATION STORAGE MEDIUM

TECHNICAL FIELD

This invention relates to an image synthesis method, a games machine, and an information storage medium.

BACKGROUND OF ART

With a games machine that enables a player to manipulate a game character to play a game such as tennis or baseball on a screen, the player selects a game stage (game field) on which to play and enjoys playing against another player or the computer on the thus selected game stage.

A games machine on which tennis can be played, for example, is provided with a number of courts (game stages) that represent the features of famous courts around the world, such as those in Britain, the US, and Australia. As one example, an English-style court is a grass court and the spectator seating is also similar to that of famous courts existing in Britain. This setup enables the player to experience the feeling of playing on a real-life famous court in practice, increasing the enjoyment of the game.

However, up until now, games machines have only possessed standard game stages for the player to select, and thus they lack variety.

Regardless of whether the game provides a plurality of game stages on which the player can play or only a single one, the game stages that can be played are limited to those prepared beforehand by the game manufacturer, and thus they are not able to provide the player with personally-designed game stage.

This invention was devised to solve the above technical problem and has as an objective thereof the provision of an image synthesis method, games machine, and information storage medium that make it possible to increase the variety of game stages on which the player can play.

Another objective of this invention is to provide an image synthesis method, games machine, and information storage medium that enable the player to enjoy a game on the player's own personally-designed game stage.

DISCLOSURE OF THE INVENTION

In order to solve the above described problem, this invention relates to an image synthesis method used in a games machine in which one of a plurality of games stages is selected and a competitive game is implemented on the thus-selected game stage: creating an image for enabling selection from the plurality of game stages of a game stage on which a player is to play; creating an image for implementing competition with another player or a computer on the thus-selected game stage; and creating an image for placing at least one item selected from items acquired during the competition into at least one game stage of the plurality of game stages selectable by the player.

In accordance with this aspect of the invention, the player selects a game stage from a game stage selection image, then plays a competitive game with another player on the thus game stage. If the player acquires an item through this competitive game, that acquired item can be placed at any preferred location on the game stage. Subsequently, the player can select the game stage on which this item has been placed and also compete against another player on that game stage. This aspect of the invention therefore makes it possible to increase the variety of game stages that the player can select. It also makes it possible to provide the player with various different personally-designed game stages, differing in the type and location of items placed therein, as well as enabling a further increase in the affection of the player for the game stages and the game because that acquired item is proof of a win.

Items that can be acquired by the player may differ between when the player is competing against the other player and when the player is competing against the computer. This enables the player to acquire items during competition against the other player that are not obtainable during competition against the computer. The fascination of the game can therefore be further increased by implementing an intensely competitive game that has the objective of acquiring items.

Another aspect of this invention relates to an image synthesis method used in a games machine capable of transferring data by means of at least one of an information storage medium for saving data and a communication line: creating an event image for enabling a player to acquire an item possessed by another player; transferring data relating to an item acquired by the player in the event image, from the other player to the player through at least one of the information storage medium for saving data and the communication line; and creating an image for placing on a game stage on which the player is playing at least one item selected from a plurality of items including the item acquired from the other player.

With this aspect of the invention, images of various events are created, such as those of a competitive game and those relating to the exchange, auction, or presentation of items. If the player acquires an item possessed by another player in one of these event images, data relating to that item is transferred from the other player to that player through an information storage medium for saving data or a communication line. The player can place that item on the game stage then play on that stage, and can also use that item as proof of a win over another player, enables a further increase in the player's affection for that game stage.

An item having a probability of possession by the player that differs from the probability of possession by the other player may be generated. Making the possession probability different for different players in this way makes it possible to increase the rarity value and uniqueness of the item. Since an item that has a high rarity value and uniqueness will become an object of envy to another player, the enthusiasm of players playing with the objective of acquiring objects can be further increased.

These probabilities can be changed according to at least one of a time factor, a random number factor, and a factor that is input by the player. The possession probability of an item can be set to be different for different players, thus increasing the rarity value and uniqueness of that item, by creating a certain item at specific times only, creating an item on the basis of a random number generated from a given random number seed, or creating an item on the basis of information that is entered by the player through the operating means.

BEST MODE FOR CARRYING OUT THE INVENTION

An embodiment of this invention will now be described with reference to the accompanying figures. Note that the description below concerns an example of this invention applied to a games machine that is capable of providing a tennis game.

Figure 1A:
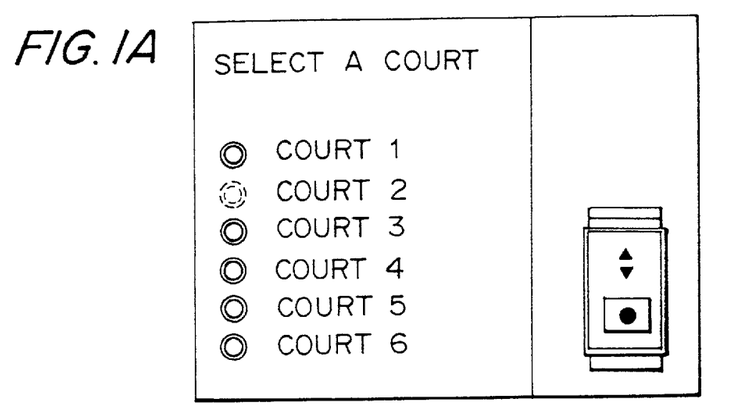
FIGS. 1A, 1B, and 1C show examples of images displayed by this embodiment.
Figure 1B:
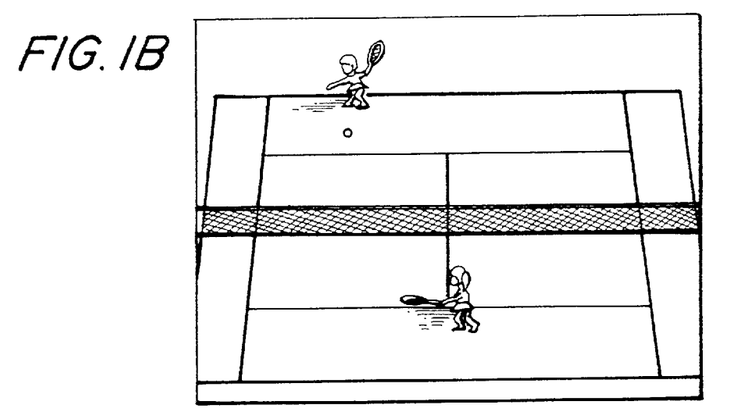
Figure 1C:
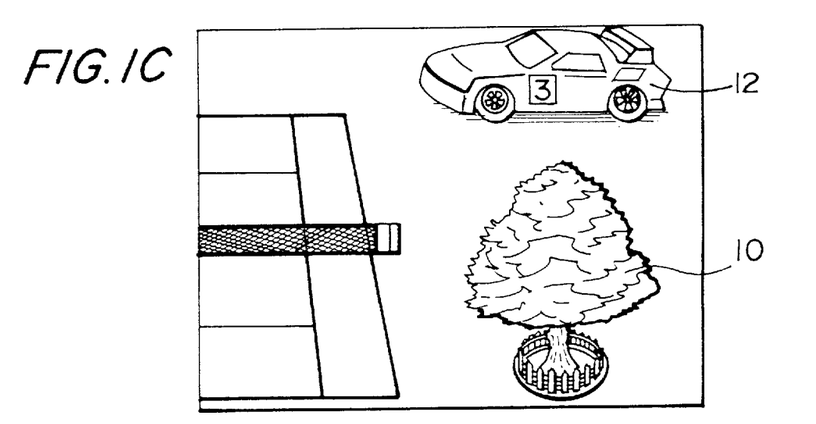

FIGS. 1A, 1B, and 1C show examples of images created by this embodiment. With the games machine of this embodiment, the player selects a court from a plurality of courts (game stages) to play upon, and plays a competitive game on the thus selected court. Therefore, this embodiment first of all creates an image for court selection, as shown in FIG. 1A. When the player selects a court, images are created to enable competition (a game of tennis) against another player or the computer on the thus selected court, as shown in FIG. 1B. A player who wins in this competition can acquire a variety of items. A characteristic of this embodiment is the way in which items 10 and 12 that have been acquired in this manner can be placed on the court as the player chooses, as shown in FIG. 1C.

Figure 2:
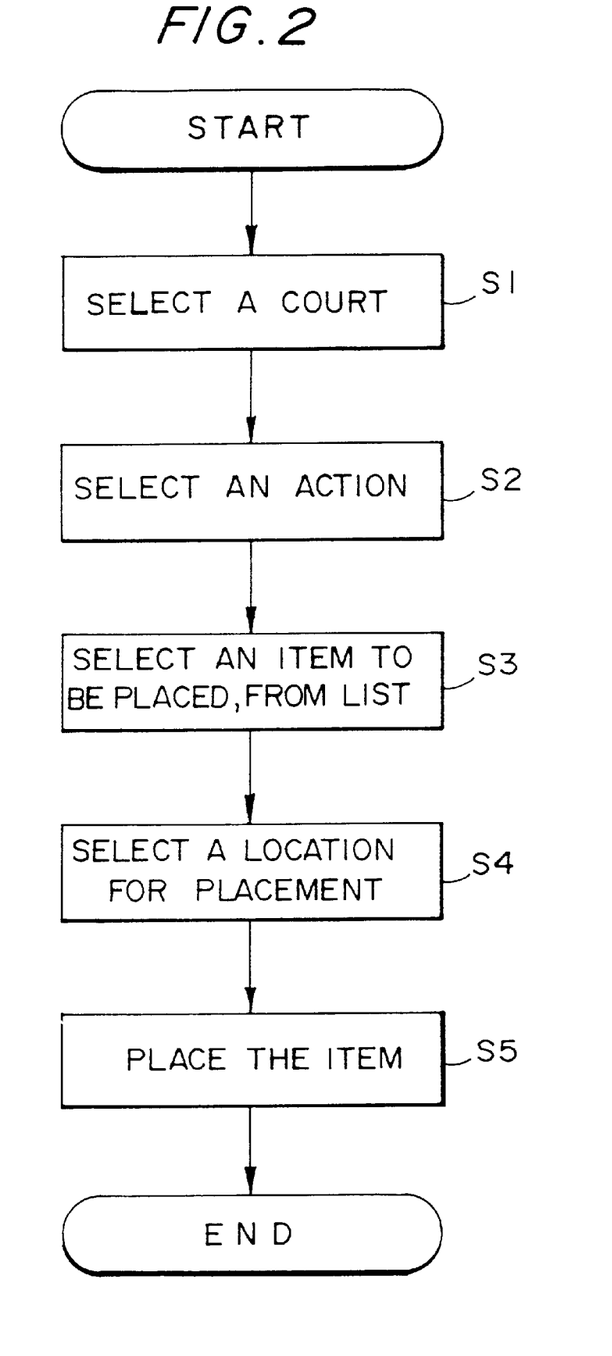
FIG. 2 is a flowchart of an example of the process of placing an item on the court.
Figure 3A:
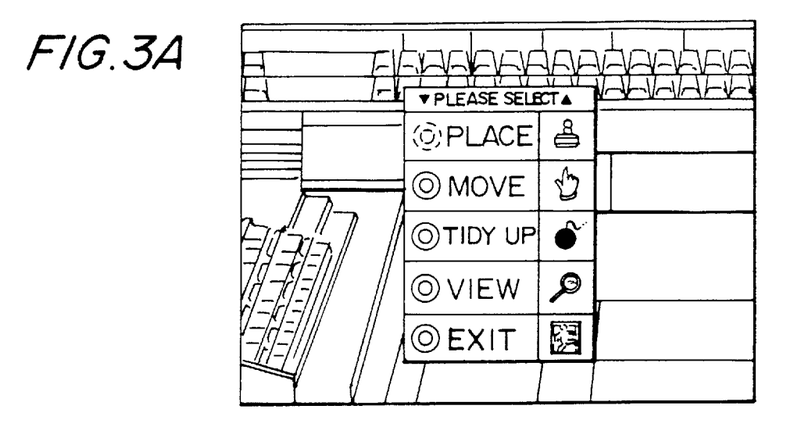
FIGS. 3A, 3B, and 3C show examples of images displayed by this embodiment.
Figure 3B:
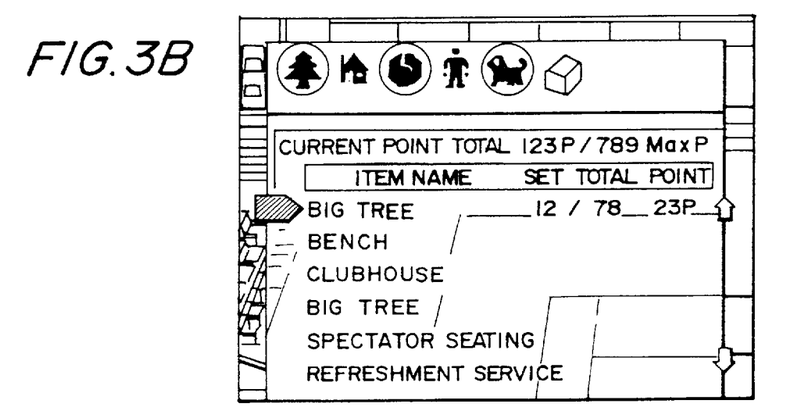
Figure 3C:
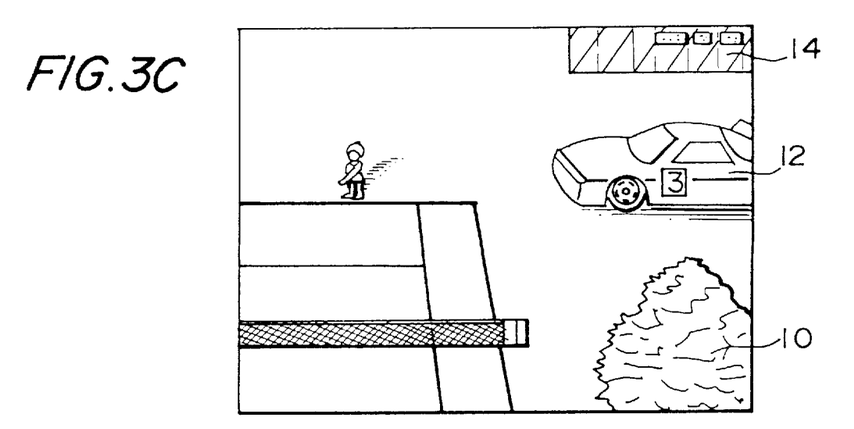

A flowchart of an example of the process of placing an item on the court is shown in FIG. 2 and examples of images generated for the item placement are shown in FIGS. 3A to 3C. The player first selects a court in which an item is to be placed, in a manner similar to that of FIG. 1A (step S1). An action selection screen such as that shown in FIG. 3A is then displayed, and the player selects an action (step S2). In this case, the item placement action is selected. An item list screen such as that shown in FIG. 3B is then displayed, and the player selects an item to place (step S3). In the case, a "big tree" is selected as the item to be placed. Finally, the player uses the cursor or similar means to select the location on the screen at which the item is to be placed, and the item is placed at that location (steps S4 and S5). An example of a court in which the thus selected item 10 (a big tree) has been placed is shown in FIG. 3C. Other items 12 and 14 that the player has acquired are also shown placed on this court. As shown in this figure, this embodiment enables the player to select a court in which are placed various items 10 to 14, to play tennis.

In prior-art games machines, the player can only select courts (game stages) that have been programmed in beforehand, and the selectable courts lack variety. In contrast thereto, this embodiment makes it possible to provide the player with personally-designed courts in addition to the previously programmed courts. In other words, this embodiment enables the player to create various different courts, by allowing the player to place acquired items therein. For example, the player could vary the court as desired by placing items such as trees, benches, a clubhouse, and spectator seating on a court that initially had nothing but a net or the like, thus enabling the player to become more attached to that court. Since the placed items are acquired by competition, they act as proof of the player's wins and enable the player to feel more satisfied. In this manner, this embodiment makes it possible to increase the variety of courts that the player can select, thus making it possible to further increase the interest of the game.

Figure 4:
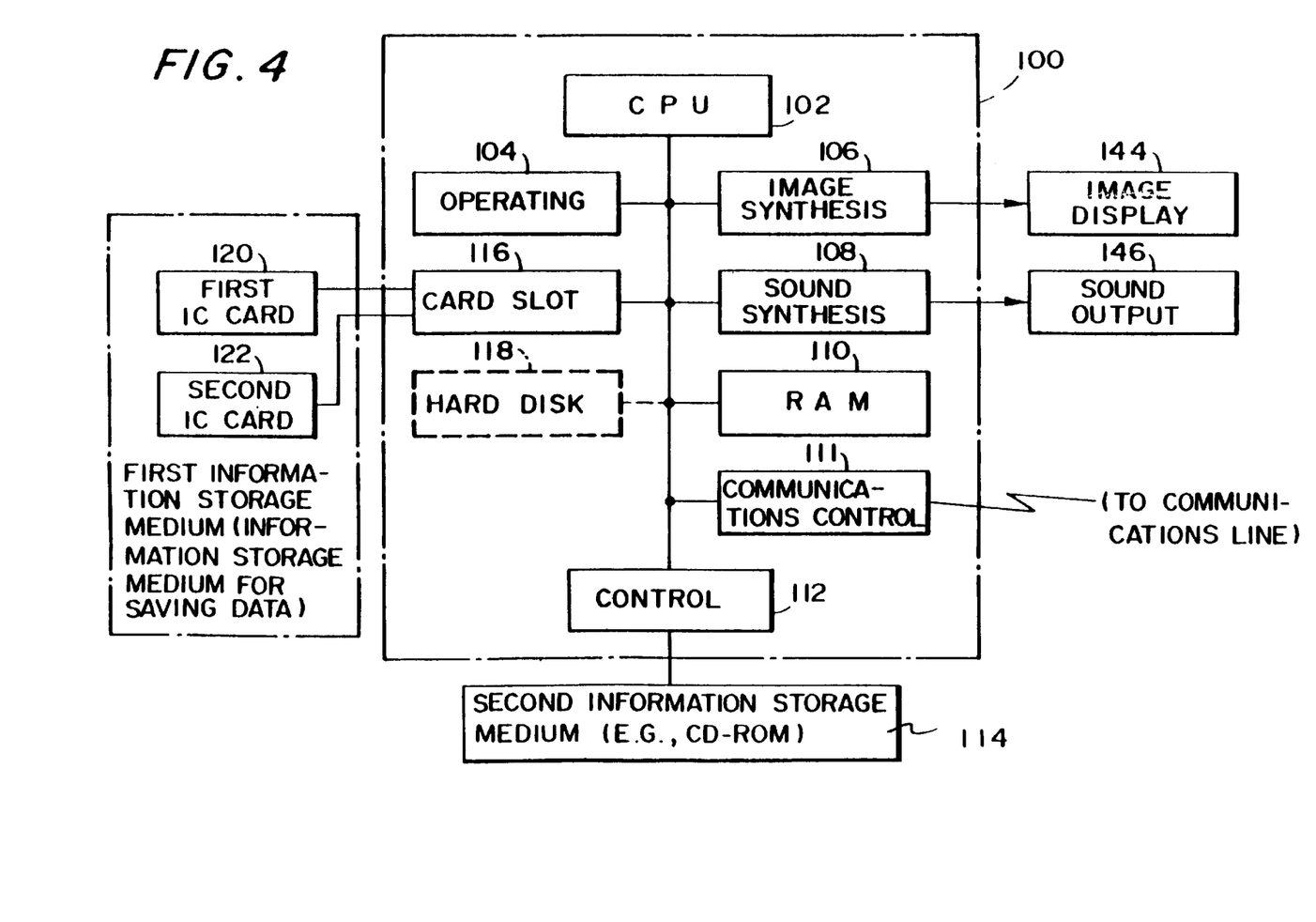
FIG. 4 shows an example of the configuration of the games machine of this embodiment.

An example of the configuration of a games machine that can implement this embodiment will now be described, with reference to FIG. 4. A main unit 100 comprises a CPU 102, an operating section 104, an image synthesis section 106, a sound synthesis section 108, RAM 110, a communications control section 111, a control section 112, and a card slot section 116. It could also comprise a data storage section such as a hard disk 118. The CPU 102 is designed to control the entire device. The operating section 104 is designed to input operating signals from the player. The image synthesis section 106 includes a dedicated image synthesis IC or the like; it creates game images in accordance with instructions from the CPU 102 and outputs them to an image display section (such as a television monitor) 144. The sound synthesis section 108 creates game sounds in accordance with instructions from the CPU 102 and outputs them to a sound output section (such as a speaker) 146. The RAM 110 acts as working memory for the CPU 102, and data that is necessary for the computations of the CPU 102 is temporarily stored therein. The communications control section 111 is designed to transfer data to and from a host system or another games machine, through a communication line. The control section 112 controls the reading of data from a second information storage medium 114.

In this case, means such as a CD-ROM, game cassette, digital video disk (DVD), magnet-optical (MO) disk, floppy disk, or memory is used as the second information storage medium 114. Various items of information are stored in this second information storage medium 114, including: information for creating an image for enabling selection of a game stage on which the player is to play, from a plurality of game stages; information for creating an image for implementing competition with another player or a computer on the thus selected game stage; information for creating an image for placing at least one item selected from items acquired during competition into at least one game stage of the plurality of game stages selectable by the player; information for creating an event image for enabling the player to acquire an item possessed by another player; and information for transferring data relating to an item acquired in the event image by the player, from the other player to the player through at least one of the information storage medium for saving data and the communication line. This information is hereinafter called stored information. This stored information comprises at least one type of information, such as program coding for performing the above described processing, image information, sound information, shape information for display objects, table data, list data, or player information. This stored information is read out by the CPU 102. The CPU 102 performs game computations (for moving the characters and displaying the background, etc.) on the basis of this stored information and operating signals from the operating section 104, and the image synthesis section 106 and the sound synthesis section 108 create images and sounds on the basis of the results of these game computations.

The card slot section 116 acts as an interface between a first information storage medium (an information storage medium for saving data) 113 and the main unit, and as a controller for the first information storage medium 113. In this embodiment, first and second IC cards 120 and 122 are inserted into the card slot section 116 as the first information storage medium 113. The first and second IC cards 120 and 122 are allocated to the first and second players, respectively, and each contains data relating to the first and second players. For that reason, the first and second IC cards 120 and 122 comprise writable memory means. This memory could be any type of memory, such as EPROM, OTPROM, EEPROM, or flash EEPROM. It could equally well be an integrated circuit device other than memory, such as a microprocessor. First and second data stored in the first and second IC cards 120 and 122 is read by the CPU 102 through the card slot section 116.

Note that the configuration could be such that a slot is provided in the game controller (operating section), and the first information storage medium 113, such as an IC card, is inserted into that slot.

If a recordable information storage medium that can both read/write data and also store the above described stored information (such as a game cassette, MO disk, or magnet disk) is used as the first information storage medium 113, the same medium can be used in common as the first information storage medium 113 and the second information storage medium 114.

Figure 6:
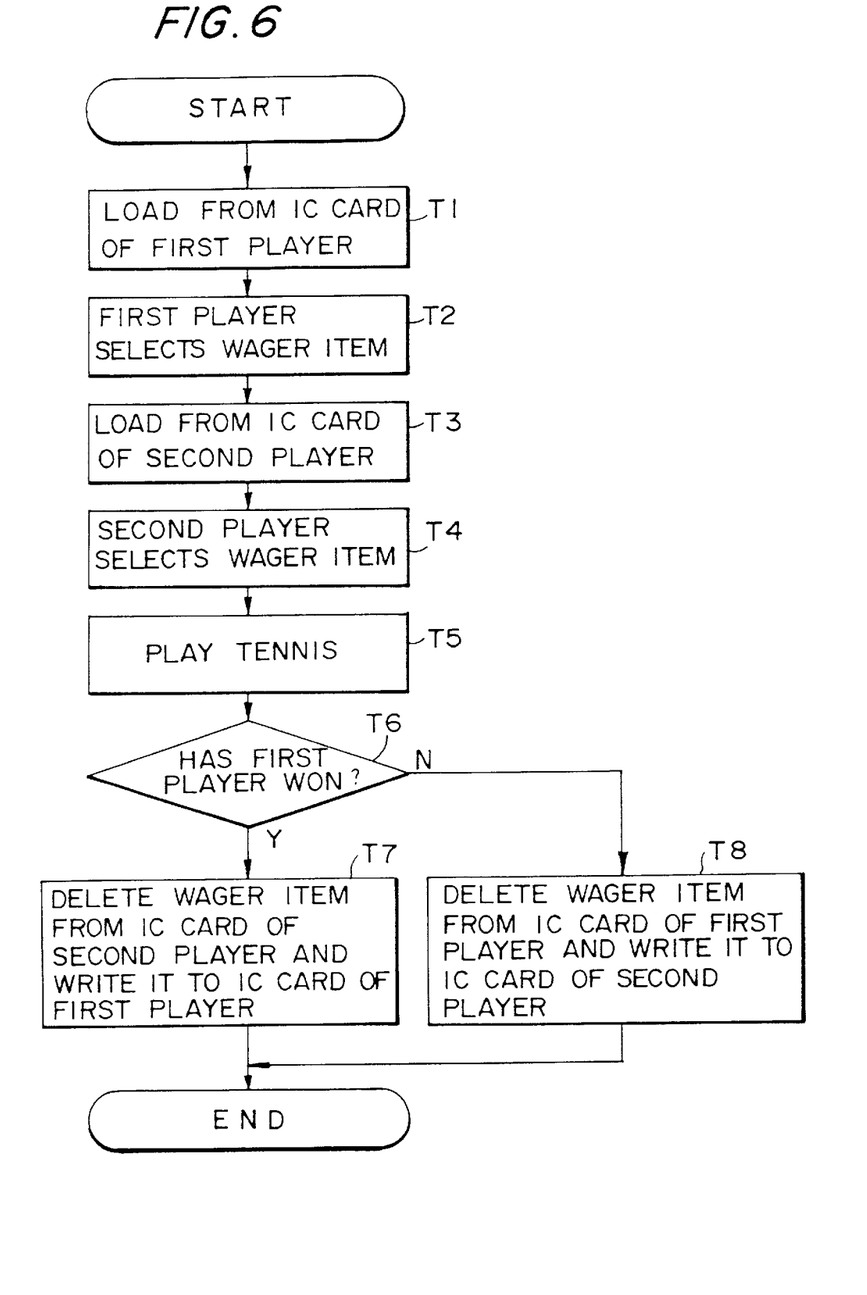
FIG. 6 is a flowchart of details of the process of transferring item data.
Figure 7:
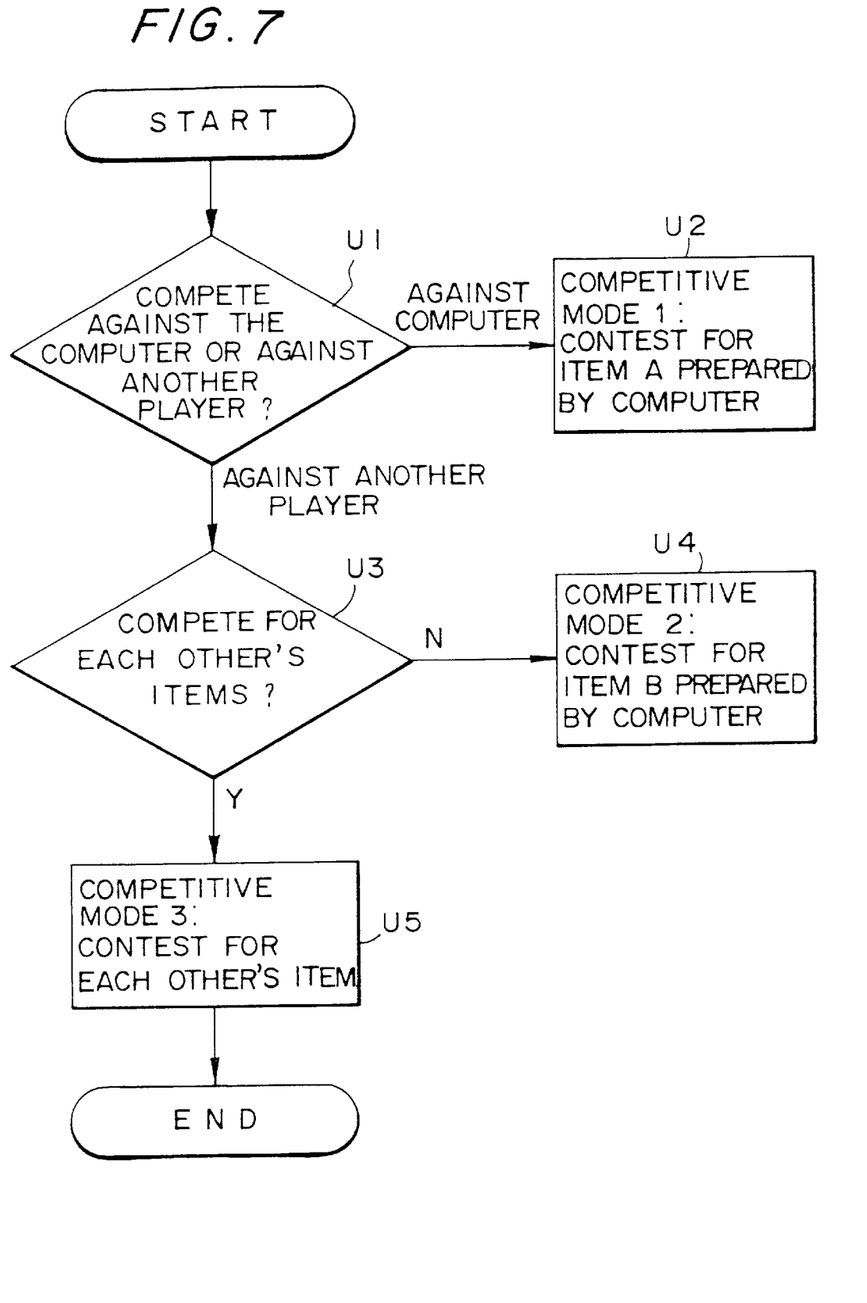
FIG. 7 is a flowchart of selection processing for competition mode.

The various images shown in FIGS. 1A to 1C and 3A to 3C are created by the CPU 102 and the image synthesis section 106 on the basis of a game program that executes the processes shown in FIGS. 2, 6, and 7, image data for display objects, and the player's operating signals from the operating section 104. The images shown in FIG. 1C are created as described below by way of example. When the player uses the operating section 104 to specify a placement location for the item 10, the CPU 102 receives that data and converts it into position data for the item 10 to be placed on the court. More specifically, identification and position data for the items 10 and 12 is stored in the RAM 110 as, for example, table data, and the CPU 102 converts the position data of the item 10 within that table data. Image data for the items 10 and 12 is stored in the RAM 110 or the second information storage medium 114, and the image synthesis section 106 creates the images shown in FIG. 1C from this image data and the modified table data.

The thus modified table data is held in the first information storage medium 113. If, for example, the first player has acquired an item and has placed it on the court, the table data for the court in which the item is placed is stored in the first IC card 120. This makes it possible for the player to use a court in which items have been placed at positions that the player desires, when competing against the computer or another player in the future, thus providing the player with a personally-designed court. The player could also prepare an IC card containing data relating to this personally-designed court and insert it into the other games machine, so that the player can use this personally-designed court when enjoying the game on the other games machine.

Note that the first information storage medium 113 could contain table data comprising identification and position data for all of the display objects on the court, or it could contain table data comprising identification and position data for the items alone.

A second characteristic of this embodiment will now be described. When the player has acquired an item owned by another player, this second characteristic enables the transfer of data relating to the acquired item, from the other player to this player through an information storage medium for saving data. Note that the data for the item could also be transferred through a communication line, using the communications control section 111 that comprises means such as a modem.

Figure 5A:
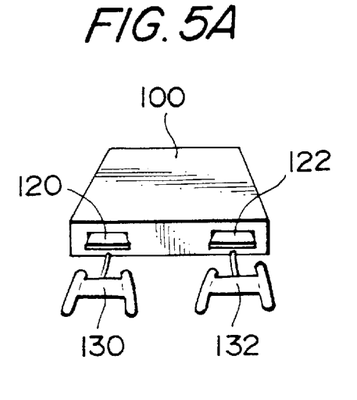
FIGS. 5A, 5B, 5C, and 5D are views illustrative of an exchange of items between players.
Figure 5B:
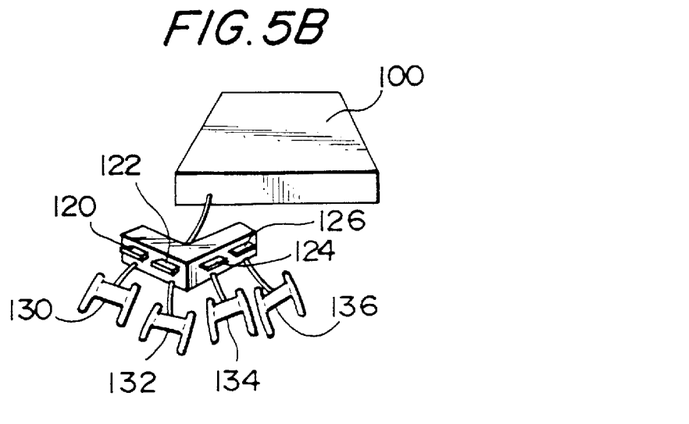

When two people are playing, for example, the first and second players insert their own individual first and second IC cards 120 and 122 into the main unit 100, as shown in FIG. 5A, and use game controllers 130 and 132 (equivalent to the operating section 104) to play the game. When four people are playing, the first to fourth players insert their own individual first to fourth IC cards 120 to 126 into the main unit 100, as shown in FIG. 5B, and use game controllers 130 to 136 to play the game. In such a case, the first and second players and the third and fourth players could form first and second pairs for a doubles match.

Figures 5C, 5D:
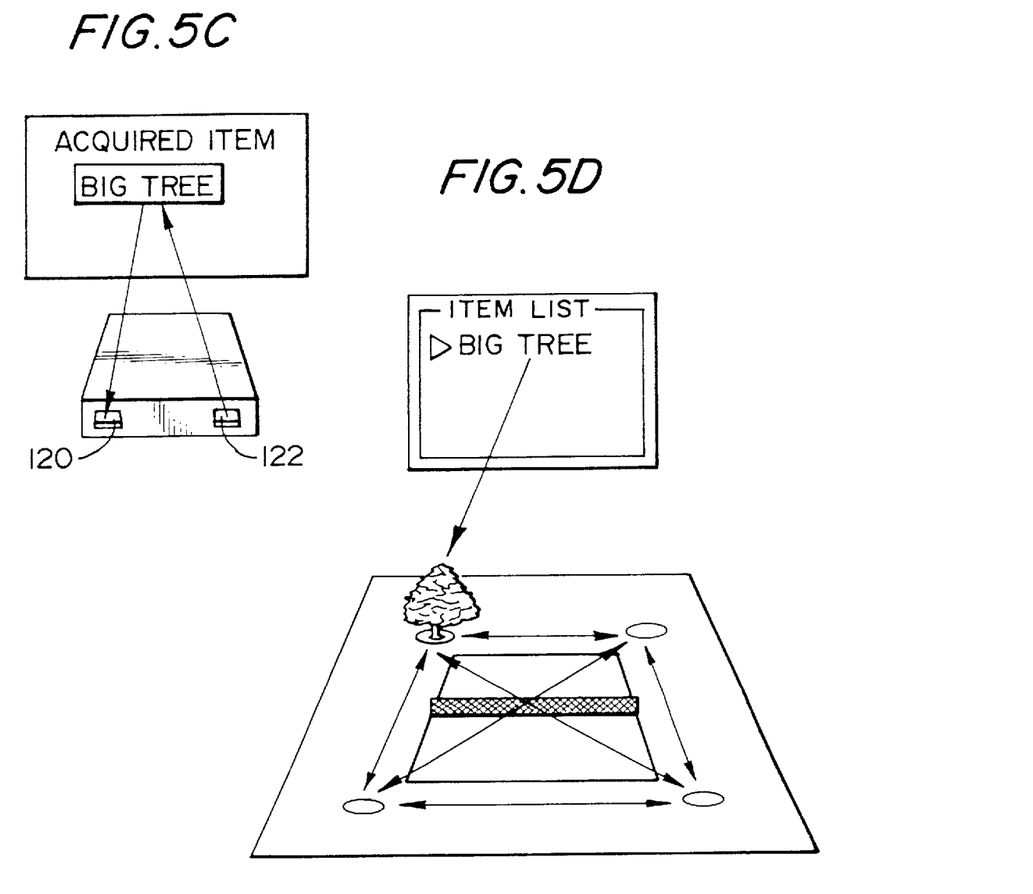

If, for example, the first and second players are competing and the first player wins, that first player can acquire an item possessed by the second player. If that happens, the acquired item "big tree" is transferred from the second IC card 122 to the first IC card 120, as shown in FIG. 5C. This makes it possible for the first player to place the acquired item "big tree" on the court as desired, as shown in FIG. 5D.

The description now turns to a detailed example of the process of transferring item data, using the flowchart of FIG. 6. First of all, details stored in the first IC card 120, which is inserted into the main unit 100, are loaded (step T1). The first IC card 120 contains data such as that on the items possessed by the first player, and that item data is loaded into the main unit 100. An item selection screen is then displayed and the first player selects a wager item from the items possessed by that player (step T2). The second player next loads details stored in the second IC card 122, which contains data such as that on items possessed by the second player (step T3). The second player then selects a wager item from the items possessed by that player (step T4). The first and second players play a game of tennis to determine a winner (step T5). If the first player wins, data relating to the second player's wager item is deleted from the second IC card 122 of the second player, and data relating to that item is written to the first IC card 120 of the first player (steps T6 and T7). If, on the other hand, the second player wins, data relating to the first player's wager item is deleted from the first IC card 120, and data relating to that item is written to the second IC card 122 (step T8).

If the first player wins, for example, the above process enables the first player to place an item acquired from the other player on a personally-designed court. This item is proof that the player has beaten another player, which can increase the feeling of satisfaction experienced by the player.

Note that it is desirable to further increase the degree of satisfaction and affection for the court of the player by assigning rarity values to items. In this embodiment, items that can be acquired by the player differ between when the player is competing against another player and when the player is competing against a computer, to give these items rarity value.

With this embodiment, a variety of different modes are provided as competition modes that the player can play. In other words, if the player selects a competition mode for play against the computer (hereinafter called competition mode 1), as shown in the flowchart of FIG. 7, a contest is held for an item A prepared by the computer (steps U1 and U2). If a competition mode against another player is selected, and if a competition mode for an item provided by the computer (hereinafter called competition mode 2) is selected, the computer prepares an item B that differs from the item A as a prize (steps U3 and U4). If a competition mode in which players compete for items possessed by each other (hereinafter called competition mode 3) is selected, a contest is held for items that are mutually submitted as prizes (step U5).

Thus this embodiment provides different items that the player can acquire in competition mode 1 and competition mode 2. If a plurality of players have gathered together to play, a special tournament can be held wherein the computer provides prizes that are rare items that are not obtainable during competition against the computer. A player who has obtained rare items in such a special tournament becomes the object of envy of other players in competition mode 3, and the combative spirit can be increased. This makes it possible to further increase interest in competitive games.

To increase the rarity value and uniqueness of an item, this embodiment provides an item having a probability of possession by one player that differs from the probability of possession by another player. If, for example, an item is prepared such that there is an extremely high probability that the first player will possess it but an extremely low probability that the second player will possess it, the rarity and uniqueness of that item will be increased, making it an object of envy to the second player. If the players compete against each other for that item, the combative spirit of the players can be increased and an intensely competitive game can be implemented.

Figure 8A:
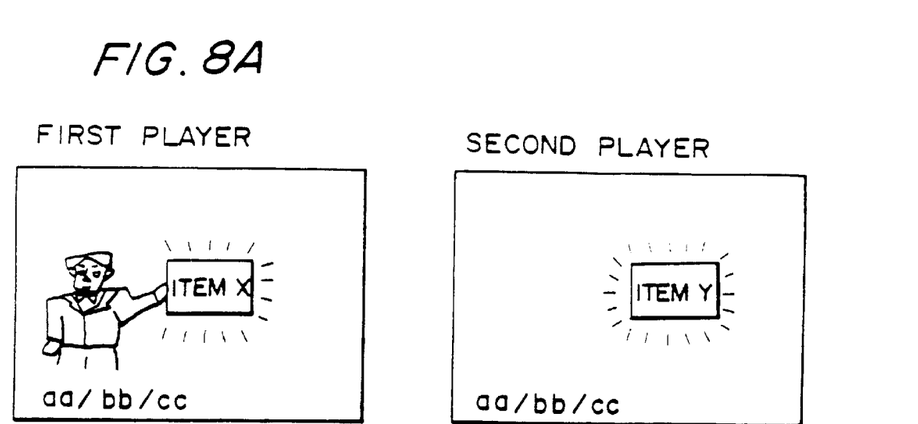
FIGS. 8A, 8B, and 8C are views illustrative of methods of providing different possession probabilities for different players.

A first method of providing different item possession probabilities for the players varies the probabilities on the basis of a time factor. The games machine could, for example, have a calendar device incorporated therein, and the configuration could be such that an item X appears when a given date is exceeded, in other words, at a date aa/bb/cc, as shown in FIG. 8A. If, for example, the item is set up so as to disappear on the following day, a first player who is playing on that day will be able to obtain the item X but a second player who is not playing on that day will not be able to obtain it. This makes the item X a sole possession of the first player, and also an object of envy to the second player. Alternatively, an item could be set up so as to appear after a given period of time has elapsed. In other words, the item is set to appear when a given period of time has elapsed such as after a game session has started, or the games machine has been switched on, or the game program has been installed. The rarity value and uniqueness of that item can be further increased by setting it to disappear subsequently.

If a calendar device is incorporated in the games machine, it is possible to determine whether or not a given date has been exceeded or whether or not a given period of time has elapsed by measuring the actual lapse of time by that calendar device and basing the determination on that actual time. If no calendar device is incorporated, a factor such as the total playing time or the total time that the games machine has been switched on could be measured by the programmable counter, a virtual time could be obtained from this total playing time or total operating time, and that virtual time could be used to determine whether or not a given date has been exceeded or whether or not a given period of time has elapsed.

Note that an even further increase in the rarity value and uniqueness of the item can be achieved by combining a time factor with a location factor, so that a certain item appears only at a specific location in the game space after a given date or after a given time has elapsed. In a role-playing game, for example, a game character manipulated by the player moves within a game space (on a map) and searches for items. Therefore, if an item is prepared that can only be acquired by a game character that is at a given location at a given time, only a player who has positioned a game character to be at that location at that time will acquire that item, which increases the rarity value and uniqueness of that item.

Figure 8B:
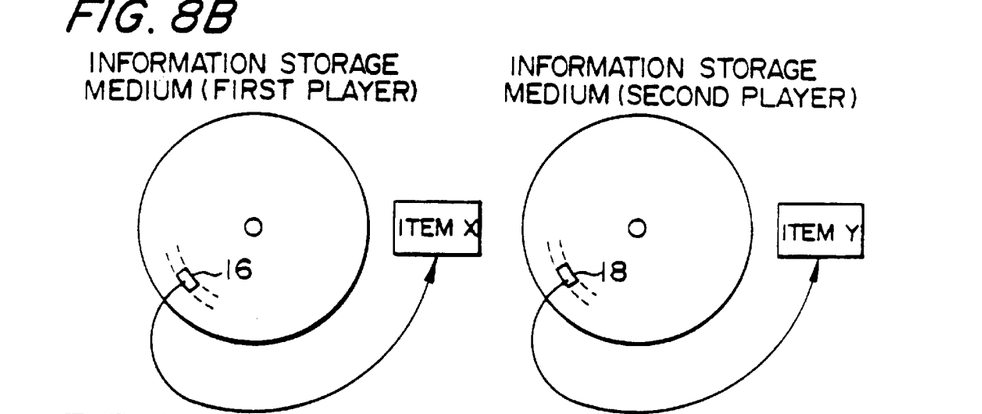
Figure 8C:
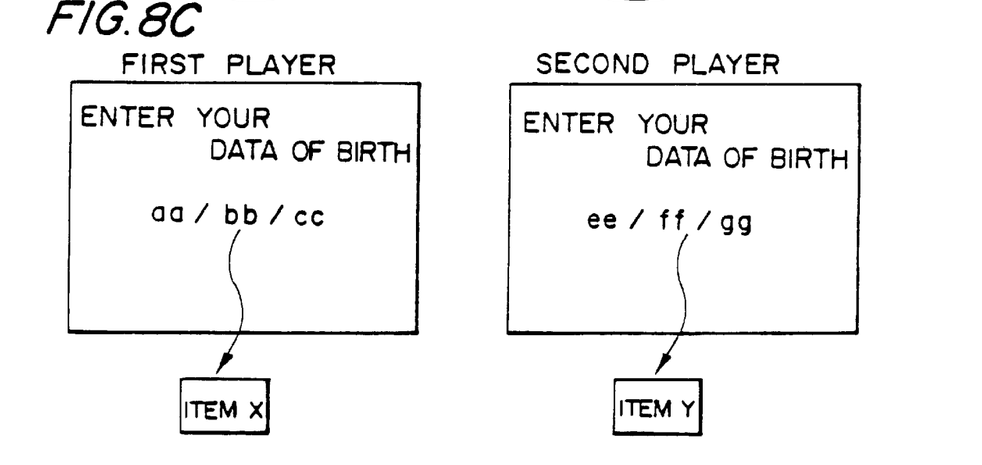

A second method creates different probabilities on the basis of a random number factor. In such a case, an item or group of items appears on the basis of a random number generated from a given random number seed. The above described actual time or virtual time could be used as the simplest source for this random number seed. Alternatively, identification data such as serial numbers 16 and 18, which are stored in an information storage medium such as a CD-ROM that contains the game program or which are written on a document provided in the packaging of that information storage medium, could be used as a random number seed, as shown by way of example in FIG. 8B. In other words, a CD-ROM owned by the first player has a serial number that differs from that of a CD-ROM owned by the second player, so that one of those serial numbers could be used as a random number seed to generate the item X for the first player and an item Y for the second player. In such a case, if random numbers a0 to a12 are obtained from this random number seed, the name of an item could be determined by a0 to a3, the shape of the item could be determined by a4 to a7, and the effect of the item could be determined by a8 to a12. Furthermore, if a player is prompted to enter a date of birth or address, the thus input date of birth or address could also be used as a random number seed. Moreover, factors such as time, serial number, and date of birth could be combined to form a random number seed, or an item could be created by using a random number generated from time as the random number seed and another random number generated from the serial number and date of birth as another random number seed.

Note that a player could be enabled to create unique items by direct input of identification data such as a serial number or other data that is input by the player (date of birth, address, telephone number, or manipulation information), without generating a random number as described above.

Various other methods could be considered as the method for allocating different possession probabilities to items. For example, an item could be made to appear in accordance with a combination of time, location, and random number factors. Furthermore, the arrangement could be such that the players themselves can create their own items, like a medicinal compound. A player could also be enabled to change the shape and color of an item on the screen, and swap it with another player. If there are a plurality of game stages, an item could also be created in accordance with the sequence in which these game stages are cleared or, taking a role-playing game as an example, the sequence in which game characters within the game space are accosted. If, for example, there are game characters A, B, C, and D that are to be consulted, the game stage could be cleared whether these game characters are consulted in the sequence A-B-C-D or D-C-B-A, but the items generated thereby could be made to differ. Thus an item acquired by a player who clears a certain game stage by consulting with the characters in the sequence A-B-C-D could be made to differ from an item acquired by a player who clears a certain game stage by consulting with the characters in the sequence D-C-B-A. Furthermore, a special item could be stored only in the IC card of a specific player or could be transferred only to a specific player through the communication line, in accordance with an event in the real world or on a network.

The description turns finally to devices of various different forms to which this embodiment is applied.

Figures 10A, 10B:
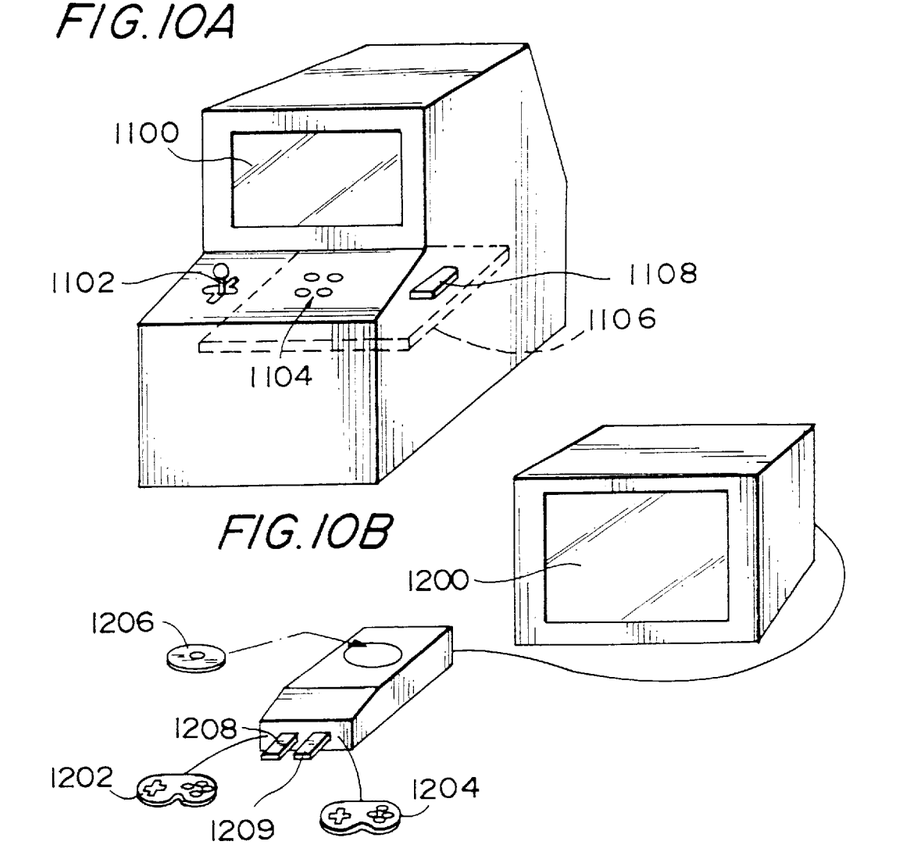
FIGS. 10A, 10B, and 10C show devices of various different forms to which this embodiment is applied.

An example of this embodiment applied to an arcade games machine is shown in FIG. 10A. A player enjoys the game by operating a joystick 1102 and buttons 1104 while viewing a game image projected onto a display 1100. Components such as a CPU, image synthesis IC, and sound synthesis IC are mounted on an IC board 1106 built into the apparatus. In this apparatus, the memory 1108 on the IC board 1106 is equivalent to the second information storage medium 114 of FIG. 4. In other words, the previously described stored information is stored in the memory 1108.

An example of this embodiment applied to a domestic games machine is shown in FIG. 10B. Players enjoy the game by operating game controllers 1202 and 1204 while viewing a game image that is projected onto a display 1200. In this case, the above described stored information is stored in a CD-ROM 1206 or the like, which is an information storage medium that can be freely inserted into and removed from the main unit.

Figure 10C:
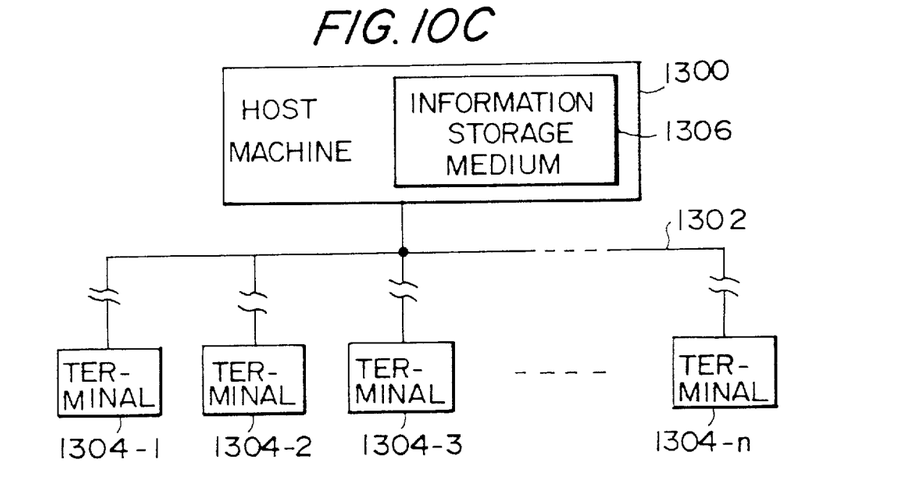

Another example of this embodiment applied to a games machine is shown in FIG. 10C, where the games machine comprises a host machine 1300 and terminals 1304-1 to 1304-n connected to the host machine 1300 by a communication line 1302. In this case, the above described stored information is stored in an information storage medium 1306 such as a magnetic disk, magnetic tape, or memory that can be controlled by the host machine 1300. If each of the terminals 1304-1 to 1304-n has a CPU, an image synthesis IC, and a sound synthesis IC, and if game images and sounds can be synthesized thereby in a standalone manner, means such as a game program for synthesizing game images and sounds is transferred from the host machine 1300. On the other hand, if they cannot be synthesized in a standalone manner, the configuration is such that the host machine 1300 creates the game images and sounds then transfers them to the terminals 1304-1 to 1304-n for output by those terminals.

Note that this invention is not limited to the embodiments thereof described above and thus it can be implemented in many various ways.

For example, this invention could be applied in various ways to sports other than tennis and to games other than sports, such as role-playing games or simulation game. The items that can be placed on the game stage are also not limited to those described above in the embodiments, and various other items could be considered. Various other game stages could also be considered, other than tennis courts. The configuration of the games machine is also not limited to that shown in FIG. 4. Furthermore, this invention can be applied to a game that three or more players can play.

Figure 9A:
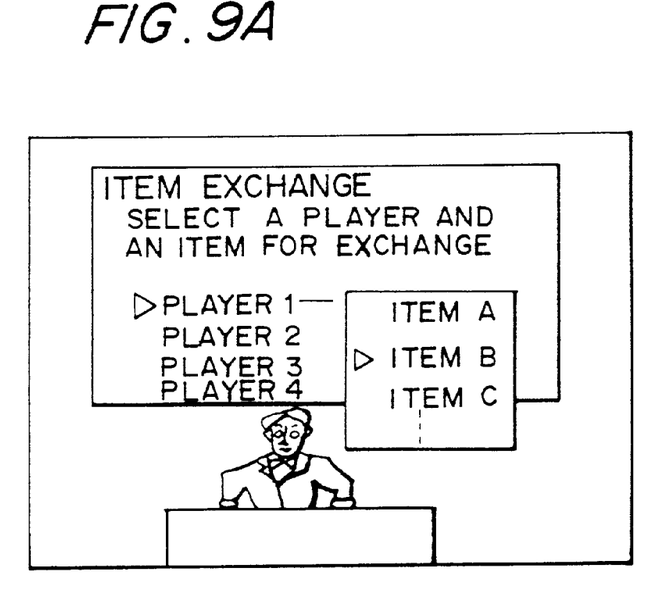
FIGS. 9A and 9B are views illustrative of event images relating to item acquisition.
Figure 9B:
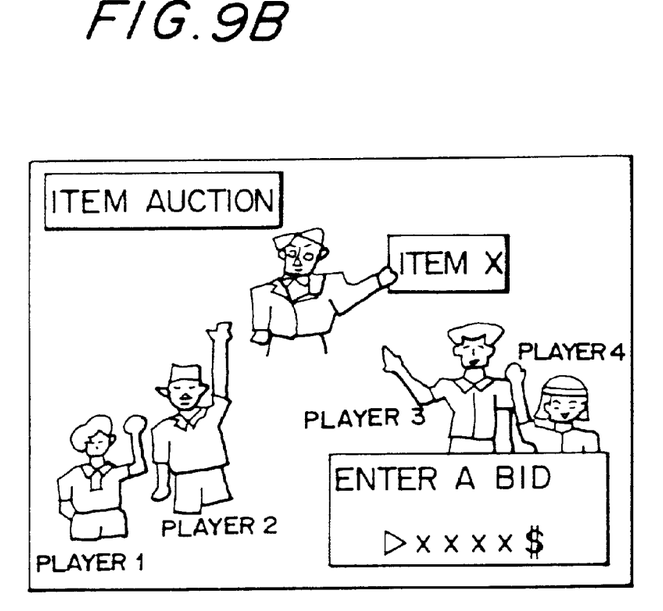

Furthermore, if items are exchanged through an information storage medium for saving data or the communication line, it is not always necessary for this to be competitive game and it is also not necessary for there to be a plurality of selectable stages. Various scenarios can be considered as events for acquiring items from other players, other than competitive games. For example, an event image of an exchange of items or an item auction could be displayed, as shown in FIGS. 9A and 9B. In addition to trade and auction, further events for the exchange of items could also be considered, such as an awards presentation or a gambling scene. Further event images could be displayed, such as one that enables a player to steal an item from another player who is playing the game at the same time, or one that enables a player to hide or place an item within the game stage of an opponent.

This invention can not only be applied to a domestic or arcade games machine, it can also be applied to various other kinds of games machines such as simulators, large games machines for an attraction where many players can participate, personal computers, multimedia terminals, and IC boards that synthesize games images.

We claim:

1. An image synthesis method used in a games machine in which one of a plurality of games stages is selected and a competitive game is implemented on the thus-selected game stage:

creating an image for enabling selection from said plurality of game stages of a game stage on which a player is to play;

creating an image for implementing competition with another player or a computer on the thus-selected game stage; and creating an image for placing at least one item selected from items acquired during said competition into at least one game stage of said plurality of game stages selectable by said player.

2. The image synthesis method as defined in claim 1, wherein:

items that can be acquired by said player differ between when said player is competing against said other player and when said player is competing against the computer.

3. The image synthesis method as defined in claim 1, wherein:

when an item possessed by said other player is acquired through said competition, data relating to said acquired item is transferred from said other player to said player through at least one of an information storage medium for saving data and a communication line.

4. The image synthesis method as defined in claim 2, wherein:

when an item possessed by said other player is acquired through said competition, data relating to said acquired item is transferred from said other player to said player through at least one of an information storage medium for saving data and a communication line.

5. The image synthesis method as defined in claim 3, wherein:

an item having a probability of possession by said player that differs from the probability of possession by said other player is generated.

6. The image synthesis method as defined in claim 4, wherein:

an item having a probability of possession by said player that differs from the probability of possession by said other player is generated.

7. The image synthesis method as defined in claim 5, wherein:

said probabilities can be changed according to at least one of a time factor, a random number factor, and a factor that is input by said player.

8. The image synthesis method as defined in claim 6, wherein:

said probabilities can be changed according to at least one of a time factor, a random number factor, and a factor that is input by said player.

9. An image synthesis method used in a games machine capable of transferring data by means of at least one of an information storage medium for saving data and a communication line:

creating an event image for enabling a player to acquire an item possessed by another player;

transferring data relating to an item acquired by said player in said event image, from said other player to said player through at least one of said information storage medium for saving data and said communication line; and creating an image for placing on a game stage on which said player is playing at least one item selected from a plurality of items including said item acquired from said other player.

10. The image synthesis method as defined in claim 9, wherein:

an item having a probability of possession by said player that differs from the probability of possession by said other player is created.

11. The image synthesis method as defined in claim 10, wherein:

said probabilities can be changed according to at least one of a time factor, a random number factor, and a factor that is input by said player.

12. A games machine in which one of a plurality of games stages is selected and a competitive game is implemented on the thus-selected game stage, comprising:

means for creating an image for enabling selection from said plurality of game stages of a game stage on which a player is to play;

means for creating an image for implementing competition with another player or a computer on the thus-selected game stage; and means for creating an image for placing at least one item selected from items acquired during said competition into at least one game stage of said plurality of game stages selectable by said player.

13. A games machine capable of transferring data by means of at least one of an information storage medium for saving data and a communication line, comprising:

means for creating an event image for enabling a player to acquire an item possessed by another player;

means for transferring data relating to an item acquired by said player in said event image, from said other player to said player through at least one of said information storage medium for saving data and said communication line; and means for creating an image for placing on a game stage on which said player is playing at least one item selected from a plurality of items including said item acquired from said other player.

14. An information storage medium used in a games machine in which one of a plurality of games stages is selected and a competitive game is implemented on the thus-selected game stage, said information storage medium comprising:

information for creating an image for enabling selection from said plurality of game stages of a game stage on which a player is to play;

information for creating an image for implementing competition with another player or a computer on the thus-selected game stage; and information for creating an image for placing at least one item selected from items acquired during said competition into at least one game stage of said plurality of game stages selectable by said player.

15. An information storage medium used in a games machine capable of transferring data by means of at least one of an information storage medium for saving data and a communication line, said information storage medium comprising:

information for creating an event image for enabling a player to acquire an item possessed by another player;

information for transferring data relating to an item acquired by said player in said event image, from said other player to said player through at least one of said information storage medium for saving data and said communication line; and information for creating an image for placing on a game stage on which said player is playing at least one item selected from a plurality of items including said item acquired from said other player.

* * * * *